US012711067B2

(12) United States Patent
Yang

(10) Patent No.: US 12,711,067 B2
(45) Date of Patent: Aug. 18, 2026

(54) CACHE MEMORY CONTROLLER FOR SYSTEM INCLUDING PLURALITY OF MEMORY DEVICES AND OPERATING METHOD OF CACHE MEMORY CONTROLLER

(71) Applicant: Samsung Electronics Co., Ltd., Suwon-si (KR)

(72) Inventor: Seungwon Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/883,239

(22) Filed: Sep. 12, 2024

(65) Prior Publication Data

US 2025/0094347 A1 Mar. 20, 2025

(30) Foreign Application Priority Data

Sep. 18, 2023 (KR) ........................ 10-2023-0124256

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC ......... G06F 12/0802; G06F 2212/1028; G06F 2212/502; G06F 12/0895; G06F 2212/1024; G06F 3/061; G06F 3/0604; G06F 3/0614; G06F 3/0658; G06F 2212/1016; G06F 2212/1032
USPC ........................................................ 711/118
See application file for complete search history.

(56) References Cited

U.S. PATENT DOCUMENTS

| | | | |
|---|---|---|---|
| 7,457,920 B1 | 11/2008 | Kornegay et al. | |
| 8,601,217 B2 | 12/2013 | Swart et al. | |
| 9,043,556 B2 | 5/2015 | Balakrishnan et al. | |
| 9,529,730 B2 | 12/2016 | Sadoughi-Yarandi et al. | |
| 10,185,668 B2 | 1/2019 | Al Sheikh et al. | |
| 11,656,997 B2 | 5/2023 | Gholkar et al. | |
| 2007/0198779 A1* | 8/2007 | Wang | G06F 12/123 711/E12.072 |

FOREIGN PATENT DOCUMENTS

| | | |
|---|---|---|
| KR | 10-1064178 B1 | 9/2011 |
| KR | 10-2013-0095202 A | 8/2013 |

* cited by examiner

*Primary Examiner* — Hua J Song
(74) *Attorney, Agent, or Firm* — Fish & Richardson P.C.

(57) ABSTRACT

A cache memory controller includes an internal memory configured to store a plurality of cost data sets and pieces of weight data on a plurality of internal elements included in the plurality of cost data sets, the plurality of cost data sets being related to data access, and a logic circuit configured to generate a first cost data set corresponding to data access to the first memory and a second cost data set corresponding to data access to the second memory, determine a target memory out of the first and second memory, based on a result of comparison of weighted sum of the first cost data set and a weighted sum of the second cost data set that are calculated based on the pieces of the weight data, and select a cache line to be replaced, out of cache lines in which data read from the target memory is stored.

18 Claims, 14 Drawing Sheets

400
200_1
DEVICE 1
210_1
Processor 1
240_1
Cache Memory Controller 1
220_1
Main Memory 1
230_1
Cache Memory 1
200_4
DEVICE 4
210_4
Processor 4
240_4
Cache Memory Controller 4
220_4
Main Memory 4
230_4
Cache Memory 4
410
200_2
DEVICE 2
210_2
Processor 2
240_2
Cache Memory Controller 2
220_2
Main Memory 2
230_2
Cache Memory 2
200_3
DEVICE 3
210_3
Processor 3
240_3
Cache Memory Controller 3
220_3
Main Memory 3
230_3
Cache Memory 3

FIG. 5

CACHE MEMORY CONTROLLER FOR SYSTEM INCLUDING PLURALITY OF MEMORY DEVICES AND OPERATING METHOD OF CACHE MEMORY CONTROLLER

CROSS-REFERENCE TO RELATED APPLICATION

This application is based on and claims priority under 35 U.S.C. § 119 to Korean Patent Application No. 10-2023-0124256, filed on Sep. 18, 2023, in the Korean Intellectual Property Office, the disclosure of which is incorporated by reference herein in its entirety.

BACKGROUND

Inventive concepts relate to a cache controller, and more particularly, to a cache controller for a system including a plurality of memory devices and an operating method of the cache controller.

A cache memory, which is a high-speed memory device between a main memory and a processor, may be used to process data at high speed. The cache memory may store data that is frequently accessed by the processor, from among data stored in the main memory, and process data at high speed although the cache memory has a small capacity.

Because the cache memory has a small capacity, data replacement may be required (or alternatively, may be advantageous) as data access progresses. Above all, when data replacement of the cache memory is needed (or alternatively, is beneficial) for a system including a plurality of memory devices, a data replacement policy for efficiently utilizing the cache memory may be required (or alternatively, may be advantageous).

SUMMARY

Inventive concepts provide a cache memory controller configured to efficiently utilize a cache memory in a system including a plurality of memory devices and an operating method of the cache memory controller.

Some example embodiments of inventive concepts provide a cache memory controller including an internal memory configured to store a plurality of cost data sets and pieces of weight data on a plurality of internal elements included in the plurality of cost data sets, the plurality of cost data sets being related to data access, and a logic circuit configured to generate a first cost data set corresponding to data access to a first memory and a second cost data set corresponding to data access to a second memory, determine a target memory out of the first memory and the second memory, based on a weighted sum of the first cost data set and a weighted sum of the second cost data set that are calculated based on the pieces of the weight data, and select a cache line to be replaced, out of cache lines in which data read from the target memory is stored, from among a plurality of cache lines included in a cache memory, when a cache miss occurs after the cache memory is full of data. The cache controller being configured to control the cache memory including the plurality of cache lines configured to temporarily store data from a first memory or a second memory.

Some example embodiments of inventive concepts provide an operating method of a cache memory controller including generating a first cost data set corresponding to data access to a first memory, generating a second cost data set corresponding to data access to a second memory, determining a target memory out of the first memory and the second memory, based on a weighted sum of the first cost data set and a weighted sum of the second cost data set that are calculated based on pieces of weight data, and selecting a cache line to be replaced, out of cache lines in which data read from the target memory is stored, from among cache lines included in a cache memory, when a cache miss occurs after the cache memory is full of data. The cache memory controller being configured to control the cache memory which is configured to temporarily store data from the first memory or the second memory.

Some example embodiments of inventive concepts provide a cache memory controller including an internal memory configured to store an index corresponding to information of a read memory from which data is retrieved, from among a first memory and a second memory, and a logic circuit configured to control a cache memory to store the index corresponding to the information of the read memory together during the storing of data in a cache memory, determine a target memory by using a Least Recently Used (LRU) scheme, and select a cache line to be replaced, from among cache lines in which an index of the target memory is stored in the cache memory, when a cache miss occurs after the cache memory is full of data. The cache memory controller being configured to control the cache memory including a plurality of cache lines configured to temporarily store data from the first memory or the second memory.

BRIEF DESCRIPTION OF THE DRAWINGS

Various example embodiments of inventive concepts will be more clearly understood from the following detailed description taken in conjunction with the accompanying drawings in which:

FIG. 5 is a flowchart of an operating method of a cache memory controller according to an example embodiment;

DETAILED DESCRIPTION

Figure 1:
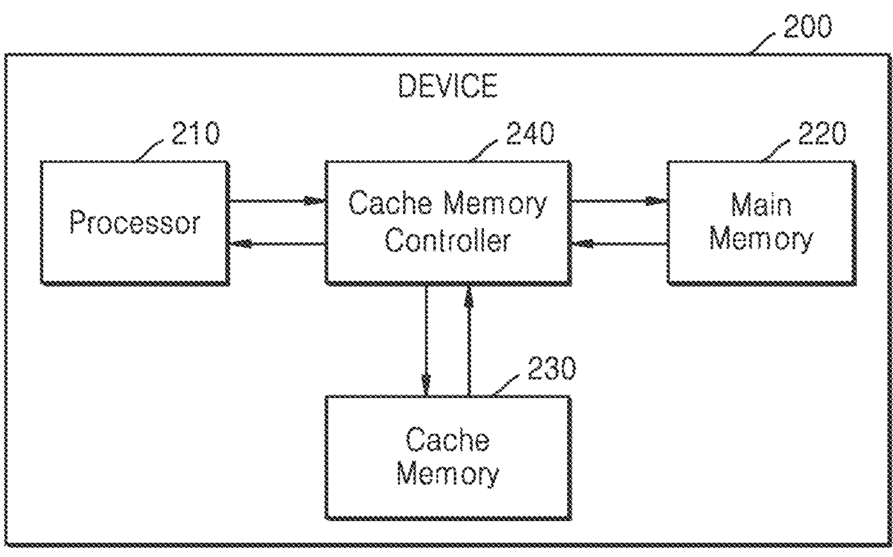
FIG. 1 is a block diagram of a device including a cache memory controller, according to an example embodiment.

Hereinafter, various example embodiments will be described in detail with reference to the accompanying drawings. The same reference numerals are used to denote the same elements in the drawings, and repeated descriptions thereof will be omitted.

FIG. 1 is a block diagram of a device 200 including a cache memory controller 240, according to an example embodiment.

Referring to FIG. 1, the device 200 according to an example embodiment may include a processor 210, a main memory 220, a cache memory 230, and the cache memory controller 240.

In an example embodiment, the device 200 may be any one of smartphones, tablet personal computers (PCs), smart TVs, mobile phones, personal digital assistants (PDAs), laptops, media players, micro servers, global positioning system (GPS) devices, e-readers, digital broadcasting terminals, navigations, kiosks, MP3 players, digital cameras, home appliances, and other mobile or non-mobile computing devices, but inventive concepts are not limited thereto. In addition, the device 200 may be a wearable device (e.g., a watch, glasses, a hairband, and a ring) with a data processing function, but inventive concepts are not limited thereto. The device 200 may include all types of devices that operate based on an operating system (OS) by using a processor. For example, the processor 210, the main memory 220, the cache memory 230, and the cache memory controller 240 of the device 200 may be implemented on one System on Chip (SoC) in the device 200.

The processor 210 may control all operations of the device 200. In an example, the processor 210 may include a main processor (e.g., a central processing unit (CPU)). The processor 210 may transmit, to the cache memory controller 240, a read request for data and a data address corresponding to the read request and receive data corresponding to the read request from the cache memory controller 240. In an example, the processor 210 may transmit, to the cache memory controller 240 or the main memory 220, a write request for data generated through an operation. However, inventive concepts are not limited thereto, and the processor 210 may directly transmit data to the cache memory 230 or the main memory 220. In addition, the processor 210 may include at least one of the cache memory 230 and the cache memory controller 240. For example, the cache memory 230 and the cache memory controller 240 may be embedded in the processor 210.

The main memory 220 may store data used by the processor 210. The main memory 220 may include a volatile memory, such as static random access memory (SRAM) and dynamic RAM (DRAM). However, inventive concepts are not limited thereto, and the main memory 220 may include any type of memory that may be accessed by the processor 210, for example, a non-volatile memory, such as flash memory, phase-change RAM (PRAM), magnetic RAM (MRAM), and ferroelectric RAM (FeRAM).

The cache memory 230 may include a plurality of cache lines configured to temporarily store data and store part of data stored in the main memory 220. The cache memory 230 may be implemented as a volatile memory (e.g., SRAM), but inventive concepts are not limited thereto. The cache memory 230 may be hierarchically connected to the other cache memories. The cache memory 230 may be connected in series between the main memory 220 and the processor 210 through the cache memory controller 240. For example, a cache directly connected to the processor 210 in the cache memory 230 may be a highest-level cache, and a cache directly connected to the main memory 220 in the cache memory 230 may be a lowest-level cache.

The cache memory 230 may have a smaller capacity than the main memory 220, but the cache memory 230 may process data at higher speed than the main memory 220. Accordingly, the cache memory 230 may be used to improve operating speed by storing mainly accessed data, from among data stored in the main memory 220. In some example embodiments, when there is a memory access request from the processor 210, the cache memory 230 may be referred to first before the main memory 220 is accessed.

The cache memory controller 240 may control all operations of the cache memory 230. In an example embodiment, the cache memory controller 240 may be implemented as a finite state machine (FSM), and the cache memory controller 240 may perform an operation corresponding to a request received from the processor 210. The cache memory controller 240 may receive, from the processor 210, a read request to read data stored in a memory. The cache memory controller 240 may request and receive requested data from the cache memory 230 or the main memory 220. Specific operations of the cache memory 230 are described below with reference to FIGS. 3A and 3B. The cache memory controller 240 may receive the requested data from the cache memory 230 or the main memory 220 and transmit the requested data to the processor 210.

Because the cache memory 230 has a smaller capacity than the main memory 220, as data access progresses, the cache memory 230 may become full of data. Afterwards, when data access is performed, data replacement may be needed (or alternatively, may be beneficial) inside the cache memory 230 to newly store recently requested data in the cache memory 230. In some example embodiments, when the data replacement of the cache memory 230 is necessary (or alternatively, is advantageous), a data replacement policy may be required (or beneficial) to efficiently utilize the cache memory 230. The cache memory controller 240 may select data to be replaced in the cache memory 230, based on at least one of Least Recently Used (LRU), Most Recently Used (MRU), Last In First Out (LIFO), and First In First Out (FIFO).

Figure 2:
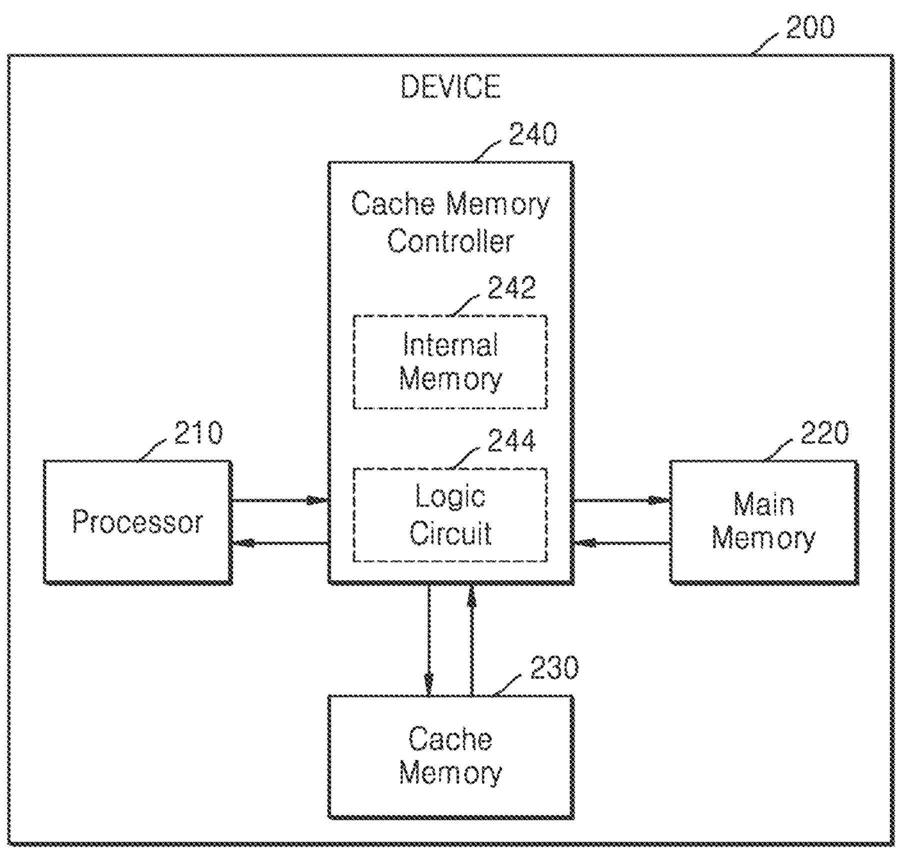
FIG. 2 is a block diagram of a device including a cache memory controller, according to an example embodiment.

FIG. 2 is a block diagram of a device 200 including a cache memory controller 240, according to an example embodiment.

Referring to FIG. 2, the device 200 according to an example embodiment may include a processor 210, a main memory 220, a cache memory 230, and the cache memory controller 240. Each of the device 200, the processor 210, the main memory 220, the cache memory 230, and the cache memory controller 240 of FIG. 2 may be an example of components of FIG. 1. Hereinafter, FIG. 2 is described with reference to the above-described example embodiments, and the same description as that provided above is omitted.

The cache memory controller 240 may include an internal memory 242 and a logic circuit 244. The internal memory 242 may store a plurality of cost data sets and pieces of weight data according to an example embodiment. Also, the internal memory 242 may store an index of a read memory. The cache memory controller 240 may update the cost data sets and the pieces of weight data and store the updated pieces of data in the internal memory 242. The internal memory 242 may be implemented as a volatile memory (e.g., SRAM), but inventive concepts are not limited thereto. Detailed descriptions of the cost data sets and the pieces of weight data are provided below with reference to FIGS. 4A and 4B.

The logic circuit 244 may control all operations of the cache memory 230. As used herein, the logic circuit 244 may function such that a control function of the cache memory controller 240 is executed.

Although not shown, the device 200 may further include an interface circuit. The interface circuit may communicate with the processor 210, the main memory 220, and the cache memory 230. The interface circuit may include a plurality of components and communicate with external devices through a bus. However, in some example embodiments, an interface circuit configured to communicate with an external device may be outside the cache memory controller 240.

Figure 3A:
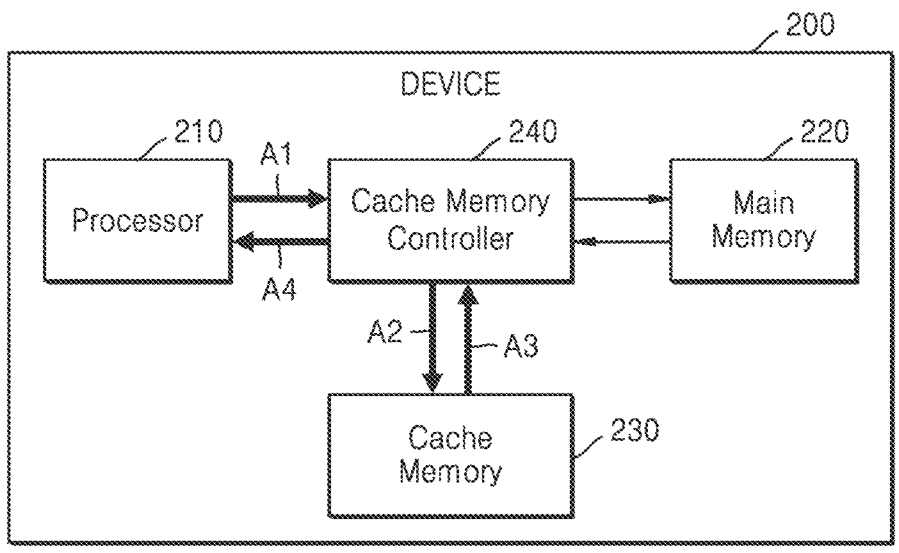
FIG. 3A is a block diagram of the flow of data when a cache hit occurs in a device including a cache memory controller, according to a comparative example.
Figure 3B:
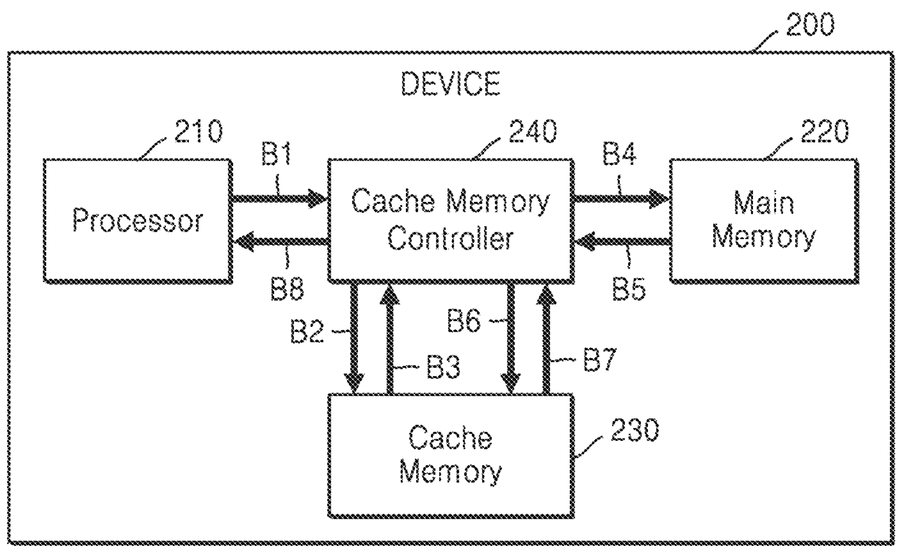
FIG. 3B is a block diagram of the flow of data when a cache miss occurs in a device including a cache memory controller, according to a comparative example.

FIG. 3A is a block diagram of the flow of data when a cache hit occurs in a device 200 including a cache memory controller 240, according to a comparative example. FIG. 3B is a block diagram of the flow of data when a cache miss occurs in a device including a cache memory controller, according to a comparative example.

The cache memory controller 240 may receive a read request from the processor 210 to read data stored in a memory. In some example embodiments, when requested data is stored in a cache memory 230, for example, in the case of a 'cache hit,' the cache memory controller 240 may read data from the cache memory 230 without accessing a main memory 220. In contrast, in some example embodiments, when the requested data is not stored in the cache memory 230, for example, in the case of a 'cache miss,' the cache memory controller 240 may request access from the main memory 220.

Referring to FIG. 3A, in the case of a cache hit, the device 200 may read data according to a series of data flows A1 to A4. The cache memory controller 240 may receive a data read request from the processor 210 (A1). The cache memory controller 240 may check whether requested data is stored in the cache memory 230 (A2). In some example embodiments, when data corresponding to the read request is in the cache memory 230, for example, in the case of the cache hit, the cache memory controller 240 may read data corresponding to a request from the cache memory 230 (A3). The cache memory controller 240 may transmit the read data to the processor 210 (A4).

In contrast, referring to FIG. 3B, in the case of the cache miss, the device 200 may read data according to a series of data flows B1 to B8. The cache memory controller 240 may receive a data read request from the processor 210 (B1). The cache memory controller 240 may check whether the requested data is stored in the cache memory 230 (B2). In some example embodiments, when data corresponding to the read request is not in the cache memory 230, for example, in the case of the cache miss, the cache memory controller 240 may receive, from the cache memory 230, a signal indicating that there is no data corresponding to the read request (B3). The cache memory controller 240 may request access to read data corresponding to the read request, from the main memory 220 (B4). The cache memory controller 240 may receive read data from the main memory 220 (B5). The cache memory controller 240 may perform transmission and checking operations such that the received read data is stored in the cache memory 230 (B6, B7). The cache memory controller 240 may transmit the received read data to the processor 210 (B8). Inventive concepts are not limited thereto, and the data flows B6 to B8 may be performed simultaneously or at different times. For example, after transmitting the received read data to the processor 210 (B8), the cache memory controller 240 may perform transmission and checking operations such that the received read data is stored in the cache memory 230 (B6, B7).

Referring to FIGS. 3A and 3B, when the data corresponding to the read request is in the cache memory 230, for example, in the case of the case hit, it may take less time to access data than in the case of the case miss. Accordingly, a policy of deciding what data to store and leave within a limited storage space of the cache memory 230 may be important (or alternatively, advantageous). Detailed descriptions of the policy of deciding data to be stored and left are described below with reference to FIGS. 4A and 4B.

Figure 4A:
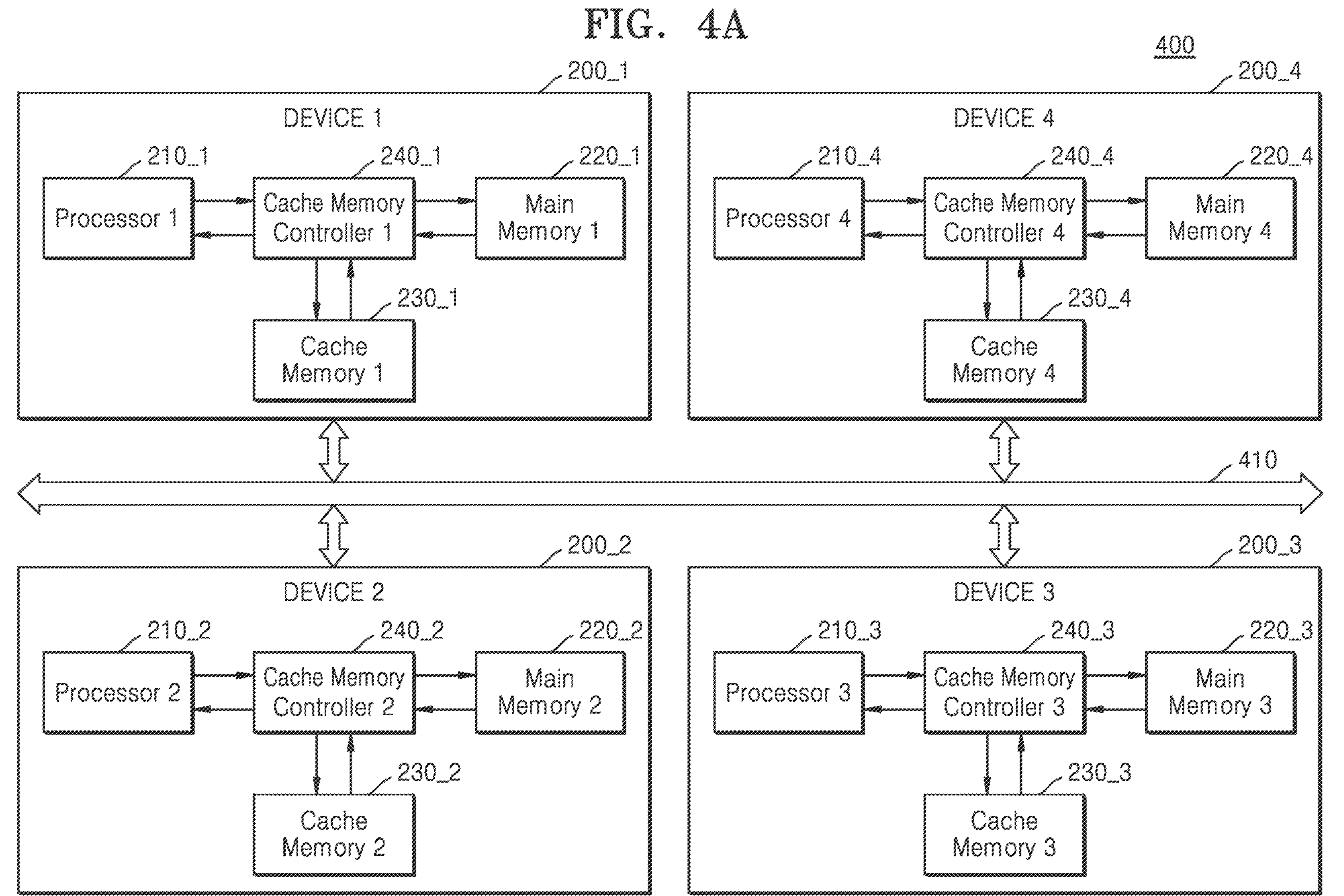
FIG. 4A is a block diagram of a system according to an example embodiment.
Figure 4B:
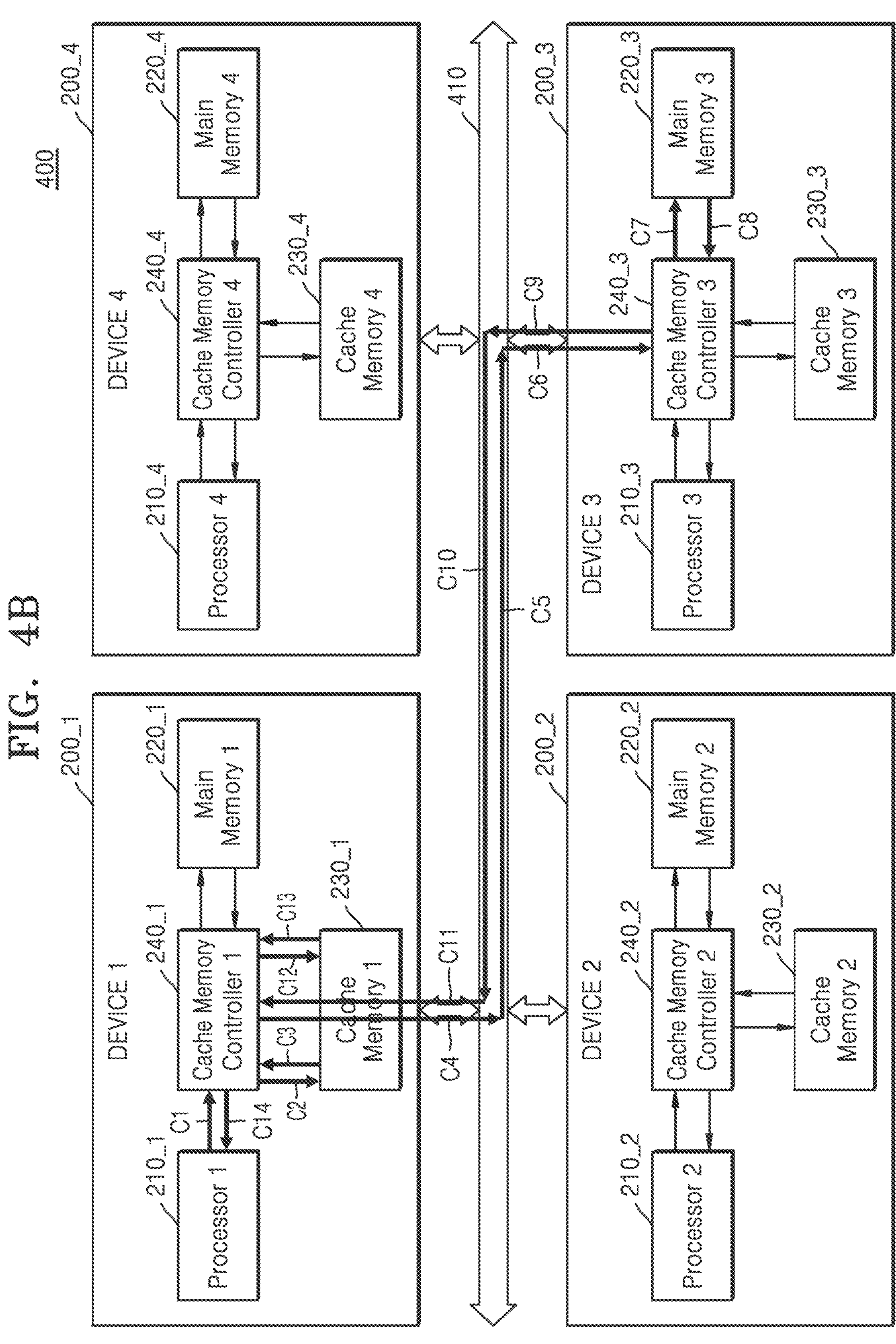
FIG. 4B is a block diagram of the flow of data when a cache miss occurs in a system, according to an example embodiment.

FIG. 4A is a block diagram of a system 400 according to an example embodiment. FIG. 4B is a block diagram of the flow of data when a cache miss occurs in the system 400, according to an example embodiment.

Referring to FIG. 4A, the system 400 may include first to fourth devices 200_1 to 200_4 and a bus 410. Each of the first to fourth devices 200_1 to 200_4 may include a processor, a main memory, a cache memory, and a cache memory controller. Inventive concepts are not limited thereto, and the system 400 may include more or fewer devices than the first to fourth devices 200_1 to 200_4. The same descriptions as those provided with reference to FIGS. 1 to 3 are omitted.

Although the system 400 may include a single device as shown in FIGS. 3A and 3B, the system 400 may include a plurality of devices as shown in FIG. 4A. The first to fourth devices 200_1 to 200_4 included in the system 400 may communicate with each other through the bus 410 and transmit and receive data to and from each other. For example, a memory that is a target of data access in the system 400 may not be constant. For example, a first processor 210_1 of the first device 200_1 may not only request to read data from a first main memory 220_1, but also may request to read data from second to fourth main memories 220_2 to 220_4.

Referring to FIG. 4B, in the case of a cache miss, the system 400 may read data according to a series of data flows C1 to C14. The first to fourth devices 200_1 to 200_4 may respectively store, in first to fourth cache memories 230_1 to 230_4, some pieces of data, from among pieces of data corresponding to read requests of first to fourth processors 210_1 to 210_4. FIG. 4B illustrates an example of a process of processing a data read request based on the first device 200_1. For example, FIG. 4B illustrates a process when the first processor 210_1 in the first device 200_1 requests to read data from the third main memory 220_3 in the third device 200_3.

Referring to FIG. 4B, a first cache memory controller 240_1 in the first device 200_1 may receive a data read request from the first processor 210_1 (C1). The first cache memory controller 240_1 may check requested data is stored in a first cache memory 230_1 (C2). In some example embodiments, when data corresponding to a read request is not in the first cache memory 230_1, for example, in the case of a cache miss, the first cache memory controller 240_1 may receive from the first cache memory 230_1 a signal indicating that there is no data corresponding to the read request (C3).

The first cache memory controller 240_1 may request access to read data corresponding to the read request, from the third main memory 220_3 (C4 to C7). Specifically, the first cache memory controller 240_1 may request access to read data from the third cache memory controller 240_3 through a bus 410 (C4 to C6), and the third cache memory controller 240_3 may request access to read data corresponding to the read request, from the third main memory 220_3 (C7). However, inventive concepts are not limited thereto, and the first cache memory controller 240_1, the third cache memory controller 240_3, and the third cache memory controller 240_3 may be connected to each other through another interface unit in the system 400, and the first cache memory controller 240_1 may request access to read data corresponding to the read request, from the third main memory 220_3, without passing through the third cache memory controller 240_3.

The first cache memory controller 240_1 may receive read data from the third main memory 220_3 (C8 to C11). Specifically, the third cache memory controller 240_3 may receive read data from the third main memory 220_3 (C8) and transmit the received read data through the bus to the first cache memory controller 240_1 (C9 to C11). However, inventive concepts are not limited thereto, and the third cache memory controller 240_3, the third main memory 220_3, and the third cache memory controller 240_3 may be connected to each other through another interface unit in the system 400, and the first cache memory controller 240_1 may receive the read data without passing through the third cache memory controller 240_3.

The first cache memory controller 240_1 may perform transmission and checking operations such that the received read data is stored in the first cache memory 230_1 (C12, C13), and the first cache memory controller 240_1 may transmit the received read data to the first processor 210_1 (C14). Inventive concepts are not limited thereto, and data flows C12 to C14 may be performed simultaneously or at different times. For example, after transmitting the received read data to the first processor 210_1 (C14), the first cache memory controller 240_1 may perform the transmission and checking operations such that the received read data is stored in the first cache memory 230_1 (C12 and C13).

While the processor 210 and the main memory 220 are included in the single device 200 in FIG. 3B, the first processor 210_1 and the third main memory 220_3 of FIG. 4B may be in different devices, and thus, processing data access may be costly and take much time (e.g., a considerate amount of time). The first cache memory controller 240_1 may perform an operation of accessing read data, from among data stored in first to fourth main memories 220_1 to 220_4 in response to a command from the first processor 210_1. In some example embodiments, it may take more time or cost to access read data, from among data stored in each of the second to fourth main memories 220_2 to 220_4, than time or cost taken to access read data, from among data stored in the first main memory 220_1. Furthermore, it may take respectively different times or costs to access data stored in the second to fourth main memories 220_2 to 220_4.

Specifically, cost may include several factors including time required (or used) for access. For example, cost may include latency data required (or used) for data access, data on power consumption required (or used), overhead data, data on usage of common resources, such as buses and systems, and low-power policy data reflecting impacts on low-power policy. Because the common resources, such as the buses and the systems, are limited, an operation of the system 400 may be determined to have been efficiently performed when less common resources are used even when access takes the same period of time. Also, cost for data access may be calculated considering the overhead of additional resources (e.g., time and memories) used in a process of accessing a memory in a remote device. As another variable, data access to a specific device in the system 400 may run counter to the low-power policy. In other words, cost may include data that quantifies the opportunity cost of performing memory access.

The first cache memory 230_1 in the system 400 may sequentially store pieces of read data, from among pieces of data in the first to fourth main memories 200_1 to 200_4, in response to a command of the first processor 210_1. As data access progresses, the first cache memory 230_1 may become full of data. Afterwards, when data access is performed in the first device 200_1, data replacement may be needed (or alternatively, may be beneficial) inside the first cache memory 230_1 to newly store recently requested data in the first cache memory 230_1. In some example embodiments, when the data replacement of the first cache memory 230_1 is necessary (or alternatively, is advantageous), a data replacement policy may be required (or alternatively, may be advantageous) to efficiently utilize the first cache memory 230_1. In some example embodiments, a target cache line for data replacement may be selected using the above-described cost. In other words, after the first cache memory 230_1 is full of data, when a cache miss occurs and new read data read from a read memory is to be stored, a policy for selecting target data or victim data to be deleted from the first cache memory 230_1 may be needed (or alternatively, may be beneficial). Hereinafter, a main memory in which read data subject to a read request is stored, from among the first to fourth main memories 220_1 to 220_4, is collectively referred to as a ‘read memory,’ data stored in a cache line to be deleted during a replacement process in the first cache memory 230_1 is collectively referred to as ‘target data,’ and a main memory in which target data is stored, from among the first to fourth main memories 220_1 to 220_4, is collectively referred to ‘target memory.’ The description of the first cache memory 230_1 may be applied to second to fourth cache memories 230_2 to 230_4.

Specifically, the first cache memory controller 240_1 may store an index corresponding to information about a read memory together when storing read data in the first cache memory 230_1. The index corresponding to the information about the read memory may be later used as a tool to find a target memory when a cache line that stores target data is selected in the first cache memory 230_1.

In an example embodiment, the system 400 may determine a target memory by using an LRU scheme. For example, the first cache memory 230_1 in the system 400 may store a plurality of pieces of data including indices respectively corresponding to the first to fourth main memories 220_1 to 220_4. The first cache controller 240_1 may include an internal memory, which is a storage medium, and sequentially store indices of read memories on which data access is performed. In some example embodiments, when a cache miss occurs and cache data needs to be replaced (or alternatively, may be replaced), the first cache controller 240_1 may utilize the indices stored in the internal memory and determine that an LRU read memory is a target memory. The first cache memory controller 240_1 may select a cache line to be replaced, of cache lines that store target memories as indices, from among a plurality of cache lines of the first cache memory 230_1. A method of selecting the cache line to be replaced may be based on at least one of LRU, MRU, LIFO, and FIFO schemes as described above.

For example, the first processor 210_1 may request the first cache memory controller 240_1 to transmit respective read requests in the order of data stored in the fourth main memory 220_4, the first main memory 220_1, the second main memory 220_2, and the third main memory 220_3. Although the first cache controller 240_1 has checked whether data stored in the third main memory 220_3 is in the first cache memory 230_1, a cache miss may occur. In some example embodiments, when the first cache memory 230_1 is full of data, the first cache controller 240_1 may determine that the fourth main memory 220_4, which is an LRU read memory, is the target memory. The first cache controller 240_1 may select a cache line to be replaced, of cache lines that store the fourth main memory 220_4, which is the target memory, as an index, from among the plurality of cache lines of the first cache memory 230_1. For example, the first cache controller 240_1 may delete data stored in an LRU cache line, from among the cache lines that have stored the fourth main memory 220_4, which is the target memory, as the index. Subsequently, the first cache controller 240_1 may replace data by storing the read data in the deleted cache line. In some example embodiments, an index of the read memory (e.g., the third main memory 220_3) from which data is read may be stored along with the read data.

In still another example, the system 400 may determine a target memory by using a method of minimizing (or alternatively, reducing) cost. Specifically, the first cache controller 240_1 may include an internal memory 242, which is a storage medium, and store a cost data set for each memory. The first cache controller 240_1 may store first to fourth cost data sets corresponding respectively to the first to fourth main memories 220_1 to 220_4 in the internal memory. A cost data set may include a plurality of internal elements by accessing a memory corresponding thereto. The internal elements included in the cost data set may include latency data, power consumption data, overhead data, data on usage of common resources, and low-power policy data as described above. The repeated descriptions thereof are omitted.

In addition, the first cache controller 240_1 may store, in the internal memory 242, pieces of weight data for determining weights of the plurality of internal elements included in the cost data set. For example, when the latency data, the power consumption data, overhead data, the data on usage of common resources, and the low-power policy data that are included in the cost data set are intended to be equally considered, the first cache controller 240_1 may store weight data with a weight ratio of 1:1:1:1:1. The weight data may be updated by an external input. According to some example embodiments, when low-power design becomes important, the first cache controller 240_1 may store weight data by applying a relatively high weight to the low-power policy data. In addition, when the main purpose is to minimize (or alternatively, reduce) latency, the first cache controller 240_1 may store weight data in which a high weight value is applied to the latency data. The first cache controller 240_1 may calculate and compare respective weighted sums of the first to fourth cost data sets. The first cache controller 240_1 may determine that a memory corresponding to a cost data set having a minimum weight sum is a target memory (or alternatively, the first cache controller 240_1 may determine that a memory corresponding to a cost data set having a weight sum is a target memory). The system 400 may include a plurality of devices and the bus, and the first to fourth main memories 220_1 to 220_4 may have different access cost characteristics depending on characteristics of the system 400. For example, based on the first device 200_1, the first main memory 220_1 may have a lowest latency. Also, the first to fourth devices 200_1 to 200_4 may have different characteristics, such as a low-power policy, power consumption, and usage of common resources. In addition, a finally determined target memory may be different depending on a value of weight data. Although the first cache controller 240_1 has checked whether data stored in the third main memory 220_3 is in the first cache memory 230_1, a cache miss may occur. In some example embodiments, when the first cache memory 230_1 is full of data, the first cache controller 240_1 may select a cache line to be replaced, from among cache lines in which an index of the target memory is stored in the first cache memory 230_1.

According to some example embodiments, in the system 400 including a plurality of memory devices, the cache memory controller 240 may efficiently utilize the first cache memory 230_1 and improve the operating speed of the system 400. Furthermore, in the system 400 including the plurality of memory devices, the cache memory controller 240 may reduce cost due to a final cache miss considering the cost of data access for each main memory 220.

Figure 5:
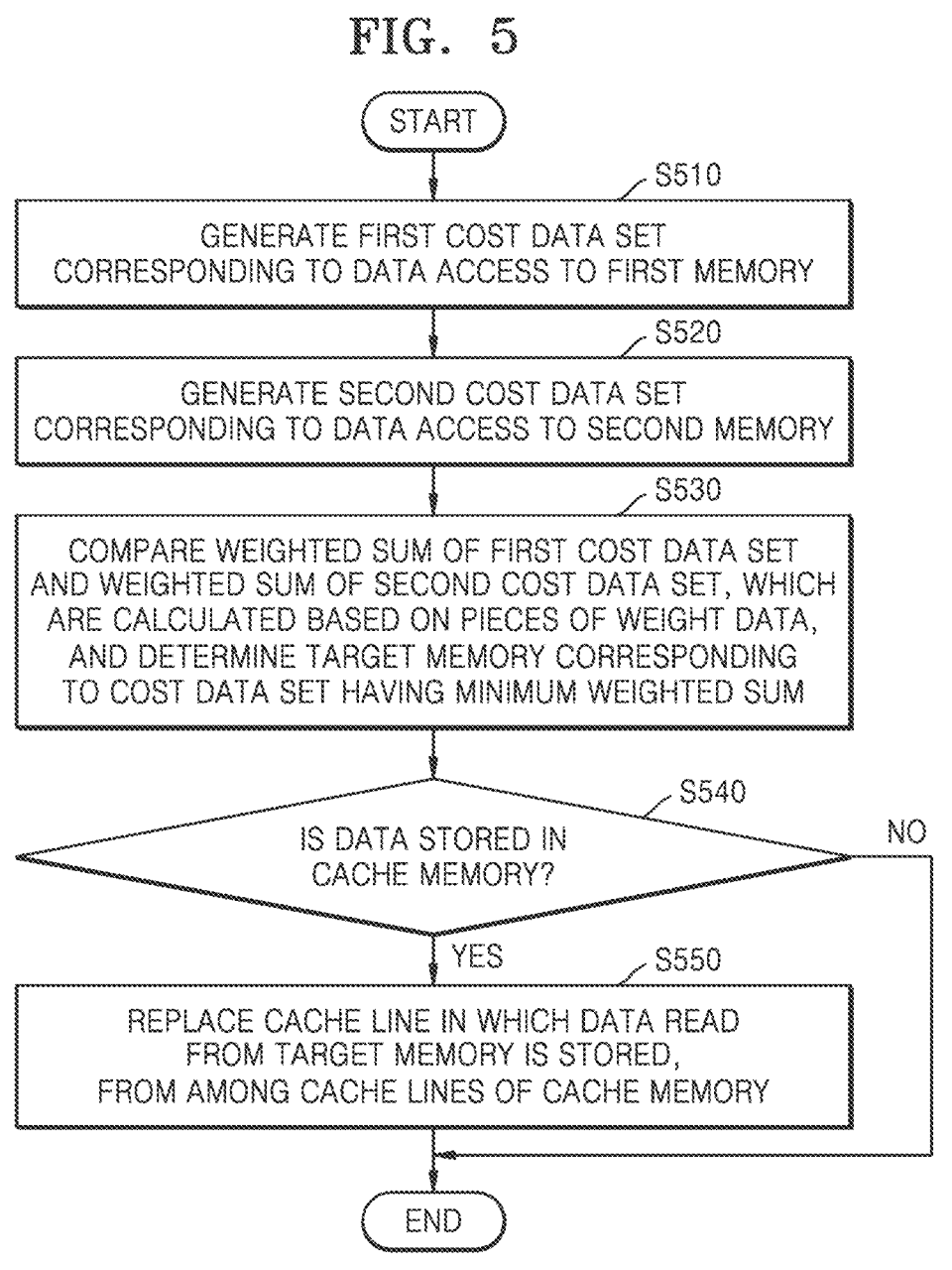
Figure 6:
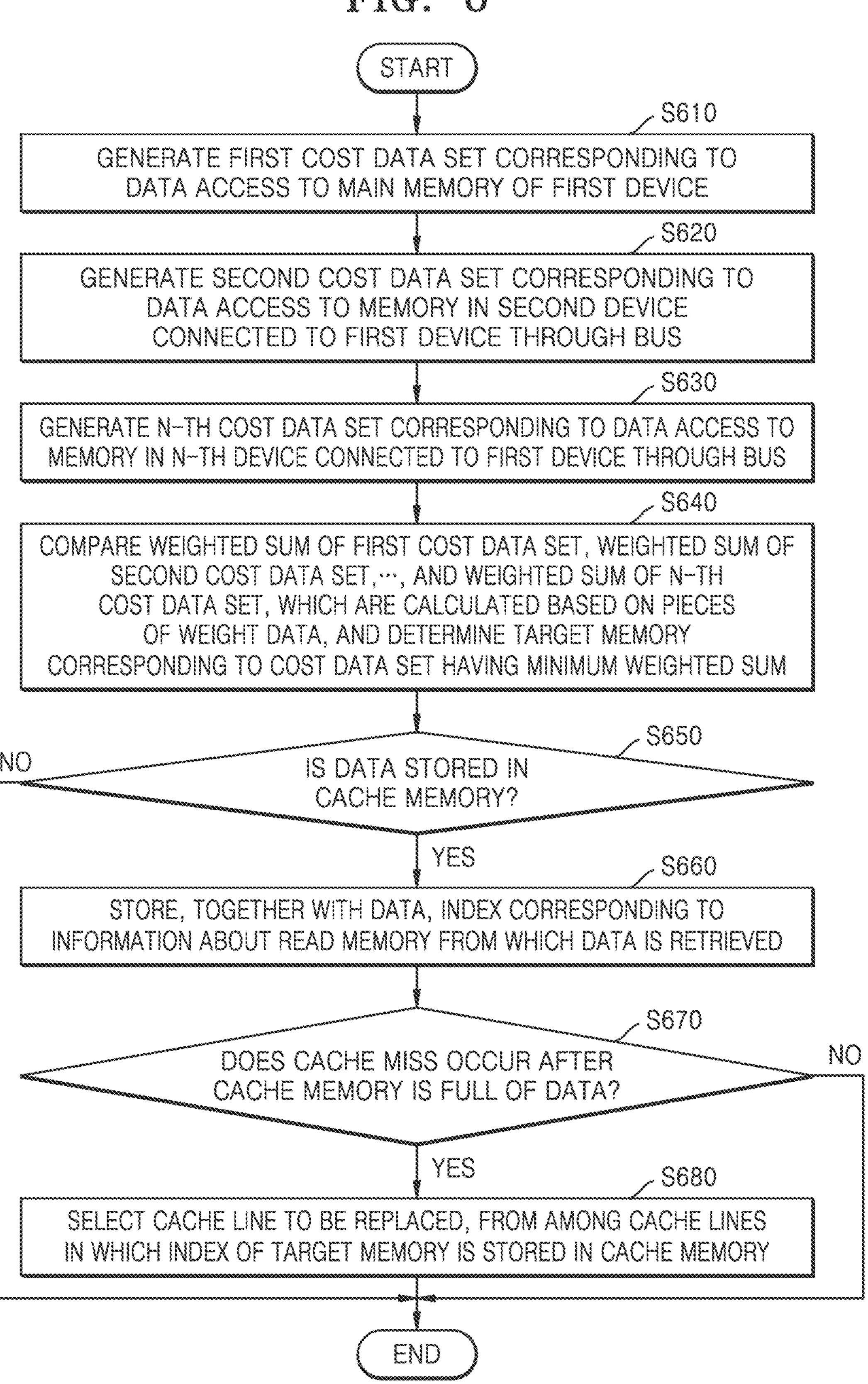
FIG. 6 is a flowchart of an operating method of a cache memory controller according to an example embodiment.

FIGS. 5 and 6 are flowcharts of an operating method of a cache memory controller 240, according to an example embodiment.

Referring to FIG. 5, the operating method of the cache memory controller 240 may include a plurality of operations S510 to S550. FIG. 5 is now described with reference to FIGS. 1 to 4B. Although the following description is based on a first cache memory controller 240_1 for brevity, inventive concepts are not limited thereto. The operation method of FIG. 5 may be applied to a cache memory controller in each of a plurality of devices.

In operation S510, the first cache memory controller 240_1 may generate a first cost data set corresponding to data access to the first main memory 220_1. In operation S520, the first cache memory controller 240_1 may generate a second cost data set corresponding to data access to the second main memory 220_2.

In operation S530, the first cache memory controller 240_1 may compare respective weighted sums of the first cost data set and the second cost data set, which are calculated based on pieces of weight data, and determine that a main memory corresponding to a cost data set having a minimum weighted sum is a target memory (or alternatively, determine that a main memory corresponding to a cost data set having a weighted sum is a target memory).

In operations S540 and S550, when data is stored in the first cache memory 230_1, the first cache memory controller 240_1 may also store an index corresponding to information about a read memory from which data is retrieved. Inventive concepts are not limited thereto, and operations S540 and S550 may be performed prior to operations S510 to S530 described above. The storing of data in the first cache memory 230_1 may refer to accessing data from a main memory due to the occurrence of a cache miss and storing the data in the first cache memory 230_1.

According to some example embodiments, in the system 400 including a plurality of memory devices, the first cache memory controller 240 may efficiently utilize the first cache memory 230 and improve the operating speed of the system 400. In addition, in the system 400 including the plurality of memory devices, the first cache memory controller 240 may reduce cost due to a final cache miss considering the cost of data access for each first main memory 220.

FIG. 6 is a flowchart of an operating method of a cache memory controller according to an example embodiment.

Unlike FIG. 5, FIG. 6 is a flowchart showing a case in which there are not two devices. The number of devices included in a system 400 is not limited to the cases of FIGS. 5 and 6 and may vary. For example, the system 400 may include N devices (e.g., N is an integer of 3 or more). In addition to the operations of FIG. 5, FIG. 6 may further include operations S650 and S660 of storing, together with data, an index corresponding to information about a read memory from which data is retrieved.

In operation S610, the first cache memory controller 240_1 may generate a first cost data set corresponding to data access to the first main memory 220_1 of the first device 200_1.

In operation S620, the first cache memory controller 240_1 may generate a second cost data set corresponding to data access to the second main memory 220_2 of the second device 220_2, which is connected to the first device 200_1 through the bus 410.

In operation S630, the first cache memory controller 240_1 may generate an N-th cost data set corresponding to data access to an N-th main memory 220_N of an N-th device 200_N, which is connected to the first device 200_1 through the bus 410.

In operation S640, the first cache memory controller 240_1 may compare respective weighted sums of the first to N-th cost data sets, which are calculated based on pieces of weight data, and determine that a main memory corresponding to a cost data set having a minimum weighted sum is a target memory (or alternatively, determine that a main memory corresponding to a cost data set having a weighted sum is a target).

In operations S650 and S660, when data is stored in the first cache memory 230_1, the first cache memory controller 240_1 may store, together with the data, an index corresponding to information about a read memory from which data is retrieved. Inventive concepts are not limited thereto, and operations S650 and S660 may be performed prior to operations S610 to S640 described above. The storing of data in the first cache memory 230_1 may refer to accessing data from a main memory due to the occurrence of a cache miss and storing the data in the first cache memory 230_1.

In operations S670 and S680, when the cache miss occurs after the cache memory is full of data, the first cache memory controller 240_1 may select a cache line out of cache lines in which an index of the target memory is stored in the first cache memory 230_1.

Figure 7:
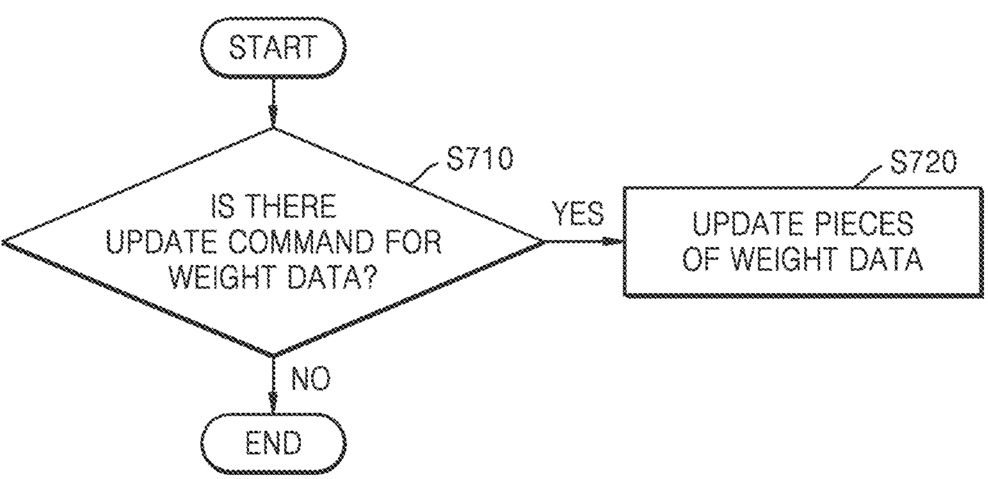
FIG. 7 is a flowchart of a method of updating pieces of weight data by a cache memory controller according to an example embodiment.

FIG. 7 is a flowchart of a method of updating, by a cache memory controller 240, pieces of weight data, according to an example embodiment.

Referring to FIG. 7, an operating method of the cache memory controller 240 may include a plurality of operations S710 to S730. FIG. 7 is now described with reference to the above-described example embodiments. Although the following description is based on a first cache memory controller 240_1 for brevity, inventive concepts are not limited thereto. The operation method of FIG. 7 may be applied to a cache memory controller in each of a plurality of devices.

As described above, the weight data may reflect a main internal element to be considered, from among a plurality of internal elements included in a cost data set. Repeated descriptions thereof are omitted.

In operation S710, the first cache memory controller 240_1 may determine whether there is an update command for weight data. Because the weight data may be requested from the outside depending on a specific situation, it may be determined whether there is an update command from the outside, based on communication made through the bus 410.

In operation S720, the first cache memory controller 240_1 may update pieces of weight data when there is the update command from the outside. The updated pieces of weight data may be stored as internal data in the first cache memory controller 240_1.

Figure 8A:
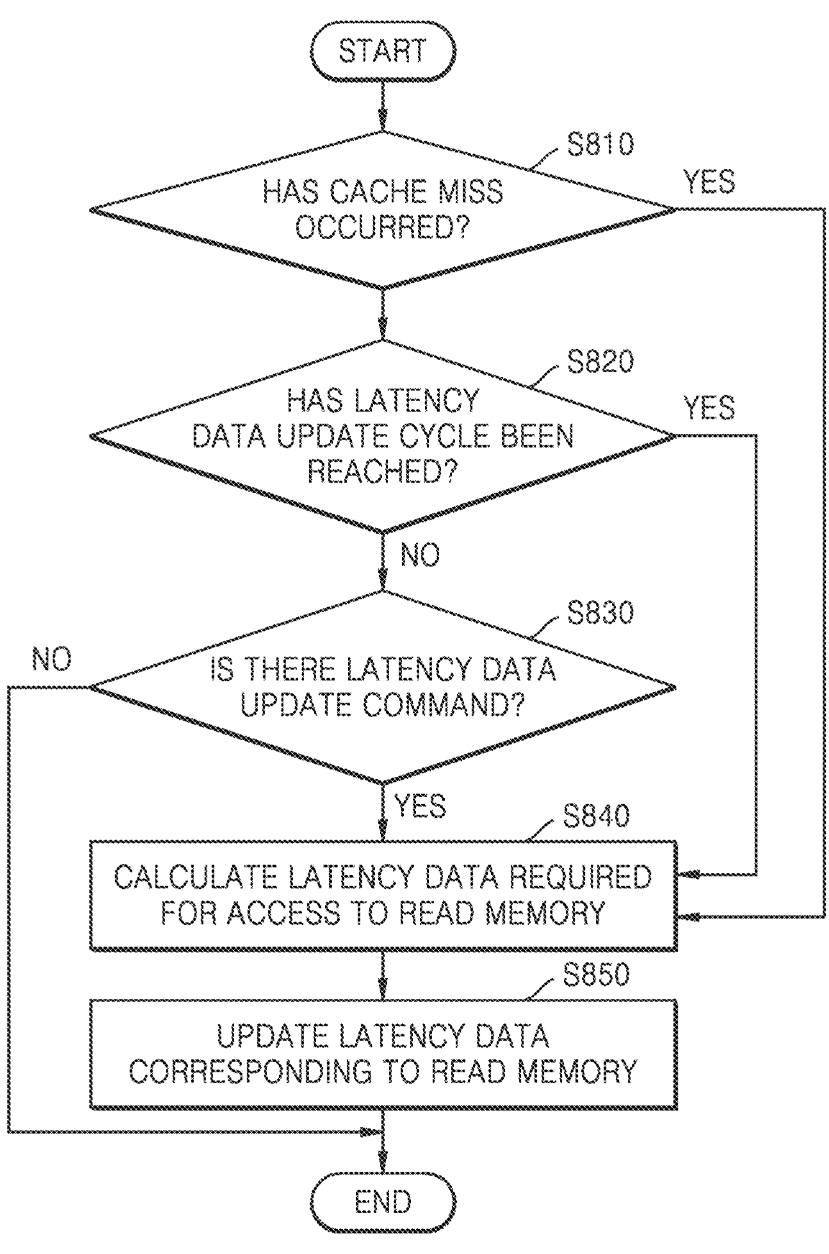
FIG. 8A is a flowchart of a method of updating latency of a read memory by a cache memory controller according to an example embodiment.
Figure 8B:
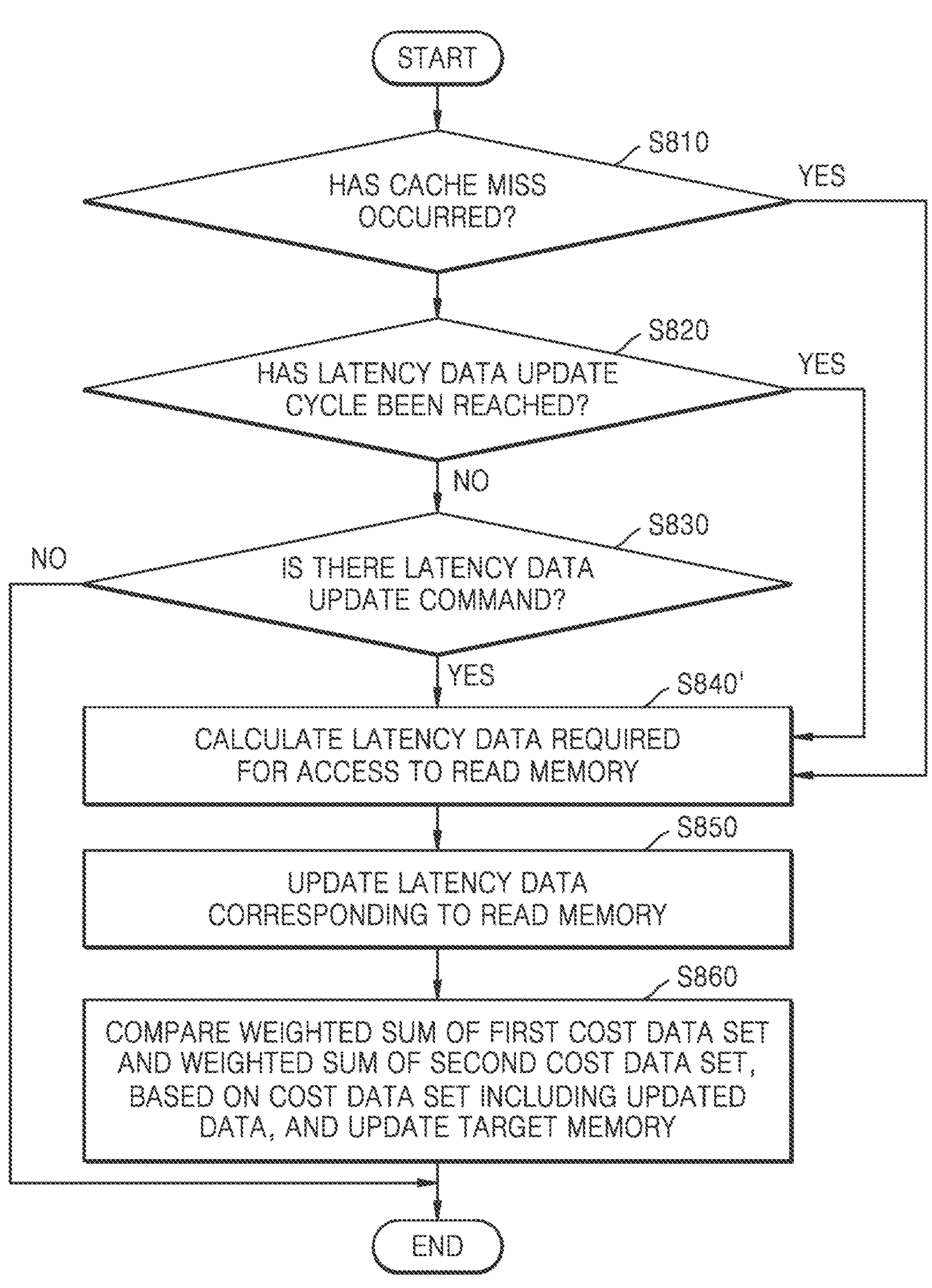
FIG. 8B is a flowchart of a method of updating a target memory after latency data is updated by a cache memory controller according to an example embodiment.

FIG. 8A is a flowchart of a method of updating latency data of a read memory by a cache memory controller according to an example embodiment. FIG. 8B is a flowchart of a method of updating a target memory after the latency data is updated by the cache memory controller according to some example embodiments.

Referring to FIGS. 8A and 8B, an operating method of the cache memory controller 240 may include a plurality of operations S810 to S860. FIGS. 8A and 8B are now described with reference to the above-described example embodiments. Although the following description is based on a first cache memory controller 240_1 for brevity, inventive concepts are not limited thereto. The operation method of FIGS. 8A and 8B may be applied to a cache memory controller in each of a plurality of devices.

In operation S810, the first cache memory controller 240_1 may determine whether a cache miss has occurred. In operation S820, the first cache memory controller 240_1 may determine whether a latency data update cycle has been reached. In operation S830, the first cache memory controller 240_1 may determine whether there is a latency data update command.

In operation S840, the first cache memory controller 240_1 may calculate latency data required (or used) for access to a read memory depending on whether the cache miss has occurred or whether a specific cycle has been reached or according to an external command. From among the above-described internal elements included in a cost data set, because the latency data is data that sensitively changes with time, the latency data may be calculated when the cache miss occurs and the read memory is accessed. The latency data may indicate a representative value of several latencies. In an example, the latency data may indicate an average value of several latencies.

In operation S850, the first cache memory controller 240_1 may update latency data corresponding to the read memory. For example, when the read memory is the third main memory 220_3, latency data included in a third cost data set may be updated to a value calculated in operation S840.

In operation S860, the first cache memory controller 240_1 may compare weighted sums of cost data sets again, based on a cost data set including the updated latency data, and update the target memory. Cost for each memory may be changed after a measured latency is reflected in the memory. For example, assuming that the second main memory 220_2 was mainly a target of replacement because cost was set low due to a very short latency (or alternatively, a short latency), when a latency of the second main memory 220_2 becomes long, a weighted sum of the second cost data set may increase. Thus, cost for data access to the second main memory 220_2 may increase. In some example embodiments, when the second main memory 220_2 is designated as the target memory, the operating speed of the system 400 may be reduced. Accordingly, by comparing the weighted sums of the cost data sets, based on the cost data set including the updated latency data again and updating the target memory, the cache memory controller 240 may continuously consider the cost of data access for each main memory 220 and reduce cost caused by a final cache miss.

Figure 9:
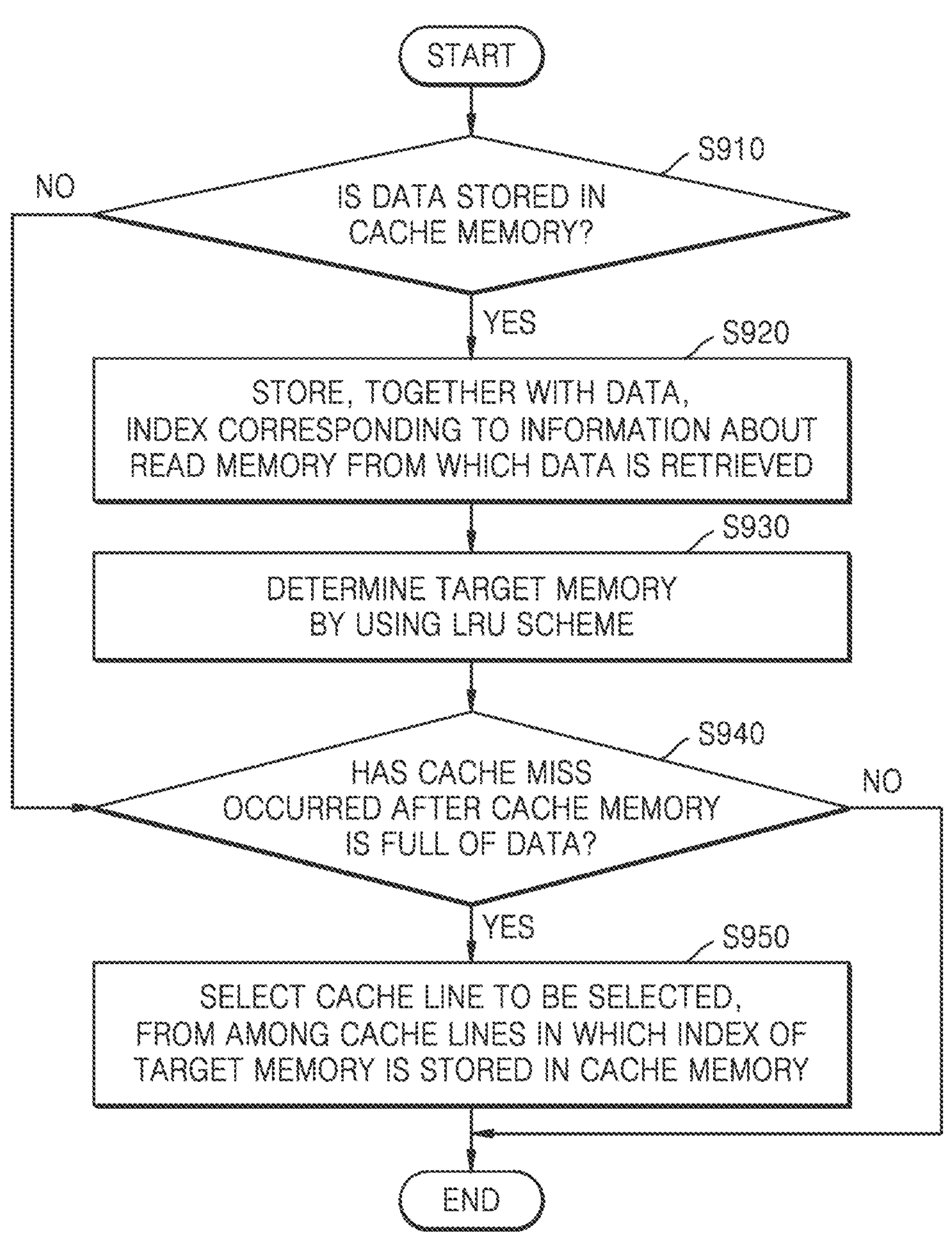
FIG. 9 is a flowchart of an operating method of a cache memory controller according to an example embodiment.

FIG. 9 is a flowchart of an operating method of a cache memory controller 240 according to an example embodiment.

Referring to FIG. 9, the operating method of the cache memory controller 240 may include a plurality of operations S910 to S950. FIG. 9 is now described with reference to the above-described example embodiments. Although the following description is based on a first cache memory controller 240_1 for brevity, inventive concepts are not limited thereto. The operating method of FIG. 9 may be applied to a cache memory controller in each of a plurality of devices.

In operations S910 and S920, when data is stored in a first cache memory 230_1, the first cache memory controller 240_1 may also store an index corresponding to information about a read memory from which data is retrieved. In operation S930, the first cache memory controller 240_1 may determine a target memory by using an LRU scheme. Repeated descriptions thereof are omitted.

In operations S940 and S950, when a cache miss occurs after the first cache memory 230_1 is full of data, the first cache memory controller 240_1 may select a cache line to be replaced, from among cache lines in which an index of the target memory is stored in the first cache memory 230_1.

Figure 10:
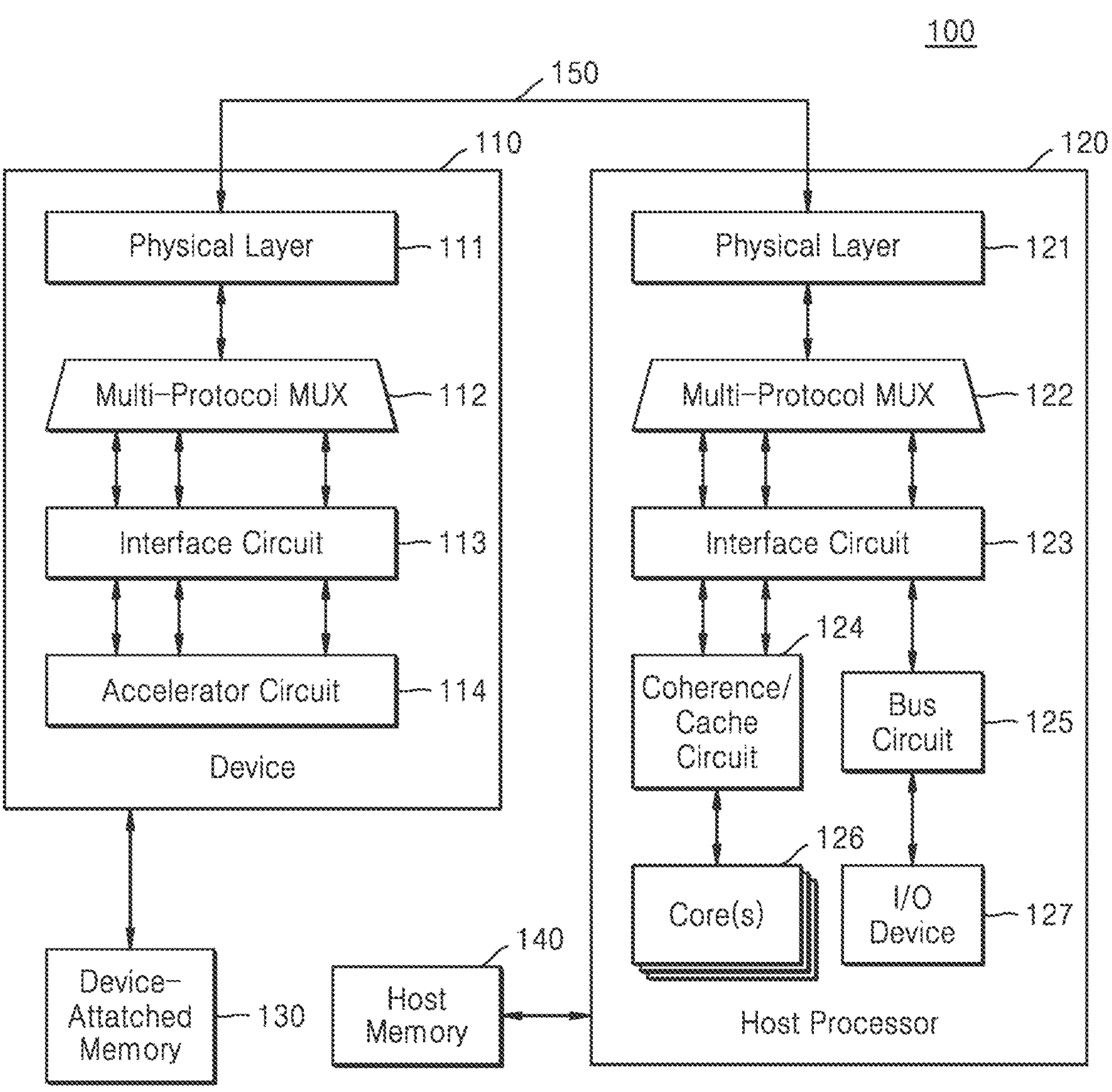
FIG. 10 is a block diagram of a system according to an example embodiment.

FIG. 10 is a block diagram of a system 100 according to an example embodiment.

Referring to FIG. 10, the system 100 may include an arbitrary computing system (or a component included in the computing system) including a device 110 and a host processor 120, which communicate with each other. For example, the system 100 may be in a stationary computing system (e.g., a desktop computer, a server, and a kiosk) or a portable computing system (e.g., a laptop computer, a mobile phone, and a wearable device). In some example embodiments, the system 100 may be included in a System-on-Chip (SoC) or a System-in-Package (SiP) in which the device 110 and the host processor 120 are implemented as one chip or package. As shown in FIG. 10, the system 100 may include the device 110, the host processor 120, a device-attached memory 130, and a host memory 140.

Referring to FIG. 10, the device 110 and the host processor 120 may communicate with each other through a link 150 and transmit and receive messages and/or data to and from each other on the link 150. Some example embodiments will be described with reference to the link 150, which is based on compute express link (CXL) that supports CXL protocols. However, the device 110 and the host processor 120 may communicate with each other based on coherent interconnect techniques, such as an XBus protocol, an NVLink protocol, an infinity fabric protocol, a cache coherent interconnect for accelerators (CCIX) protocol, and a coherent accelerator processor interface (CAPI) protocol, but inventive concepts are not limited thereto.

In some example embodiments, the link 150 may support a plurality of protocols, and messages and/or data may be transmitted through the plurality of protocols. For example, the link 150 may support CXL protocols including a non-coherent protocol (e.g., CXL.io), a coherent protocol (e.g., CXL.cache), and a memory access protocol (or a memory protocol) (e.g., CXL.mem). In some example embodiments, the link 150 may support, but is not limited thereto, a protocol, such as peripheral component interconnect (PCI), PCI-express (PCIe), universal serial bus (USB), and serial advanced technology attachment (SATA). As used herein, a protocol supported by the link 150 may be referred to as an interconnection protocol.

The device 110 may refer to an arbitrary device that provides useful functions to the host processor 120. In some example embodiments, the device 110 may correspond to a CXL-based accelerator. For example, software executed on the host processor 120 may offload at least some of computing operations and/or I/O operations to the device 110. In some example embodiments, the device 110 may include at least one of a programmable component (e.g., a graphics processing unit (GPU) and a neural processing unit (NPU)), a component (e.g., an intellectual property (IP) core) configured to provide a fixed function, and a reconfigurable component (e.g., a field programmable gate array (FPGA)). As shown in FIG. 10, the device 110 may include a physical layer 111, a multi-protocol multiplexer (MUX) 112, an interface circuit 113, and an accelerator circuit 114 and communicate with the device-attached memory 130.

The accelerator circuit 114 may perform useful functions provided by the device 110 to the host processor 120 and may be referred to as an accelerator logic. As shown in FIG. 10, when the device-attached memory 130 is in the system 100, the accelerator circuit 114 may communicate with the device-attached memory 130 based on a protocol (e.g., a device-specific protocol) that is independent of the link 150. In addition, as shown in FIG. 1, the accelerator circuit 114 may communicate with the host processor 120 through the interface circuit 113 by using a plurality of protocols.

The interface circuit 113 may determine one of the plurality of protocols based on messages and/or data for communication between the accelerator logic 114 and the host processor 120. The interface circuit 113 may be connected to at least one protocol queue included in the multi-protocol MUX 112 and transmit and receive messages and/or data to and from the host processor 120 through the at least one protocol queue. In some example embodiments, the interface circuit 113 and the multi-protocol MUX 112 may be integrally formed into one component. In some example embodiments, the multi-protocol MUX 112 may include a plurality of protocol queues respectively corresponding to the plurality of protocols supported by the link 150. In some example embodiments, the multi-protocol MUX 112 may arbitrate communications of different protocols and provide selected communications to the physical layer 111. In some example embodiments, the physical layer 111 may be connected to a physical layer 121 of the host processor 120 through single interconnect, a bus, a trace, or the like.

The host processor 120 may be a main processor (e.g., a CPU) of the system 100. In some example embodiments, the host processor 120 may be a CXL-based host processor or host. As shown in FIG. 10, the host processor 120 may be connected to the host memory 140 and include the physical layer 121, a multi-protocol MUX 122, an interface circuit 123, a coherence/cache circuit 124, a bus circuit 125, at least one core 126, and an input/output (I/O) device 127.

The at least one core 126 may execute an instruction and be connected to the coherence/cache circuit 124. The coherence/cache circuit 124 may include a cache hierarchy and be referred to as a coherence/cache logic. As shown in FIG. 1, the coherence/cache circuit 124 may communicate with the at least one core 126 and the interface circuit 123. For example, the coherence/cache circuit 124 may enable communication through at least two protocols including a coherent protocol and a memory access protocol. In some example embodiments, the coherence/cache circuit 124 may include a direct memory access (DMA) circuit. The I/O device 127 may be used to communicate with the bus circuit 125. For example, the bus circuit 125 may be a PCIe logic, and the I/O device 127 may be a PCIe I/O device.

The interface circuit 123 may enable communication between components (e.g., the coherence/cache circuit 124 and the bus circuit 125) of the host processor 120 and the device 110. In some example embodiments, the interface circuit 123 may enable communication between the components of the host processor 120 and the device 110 according to a plurality of protocols (e.g., the non-coherent protocol, the coherent protocol, and the memory protocol). For example, the interface circuit 123 may determine one of the plurality of protocols based on the messages and/or data for communication between the components of the host processor 120 and the device 110.

The multi-protocol MUX 122 may include at least one protocol queue. The interface circuit 123 may be connected to the at least one protocol queue and transmit and receive messages and/or data to and from the device 110 through the at least one protocol queue. In some example embodiments, the interface circuit 123 and the multi-protocol MUX 122 may be integrally formed into one component. In some example embodiments, the multi-protocol MUX 122 may include a plurality of protocol queues respectively corresponding to the plurality of protocols supported by the link 150. In some example embodiments, the multi-protocol MUX 122 may arbitrate communications of different protocols and provide selected communications to the physical layer 121.

Figure 11:
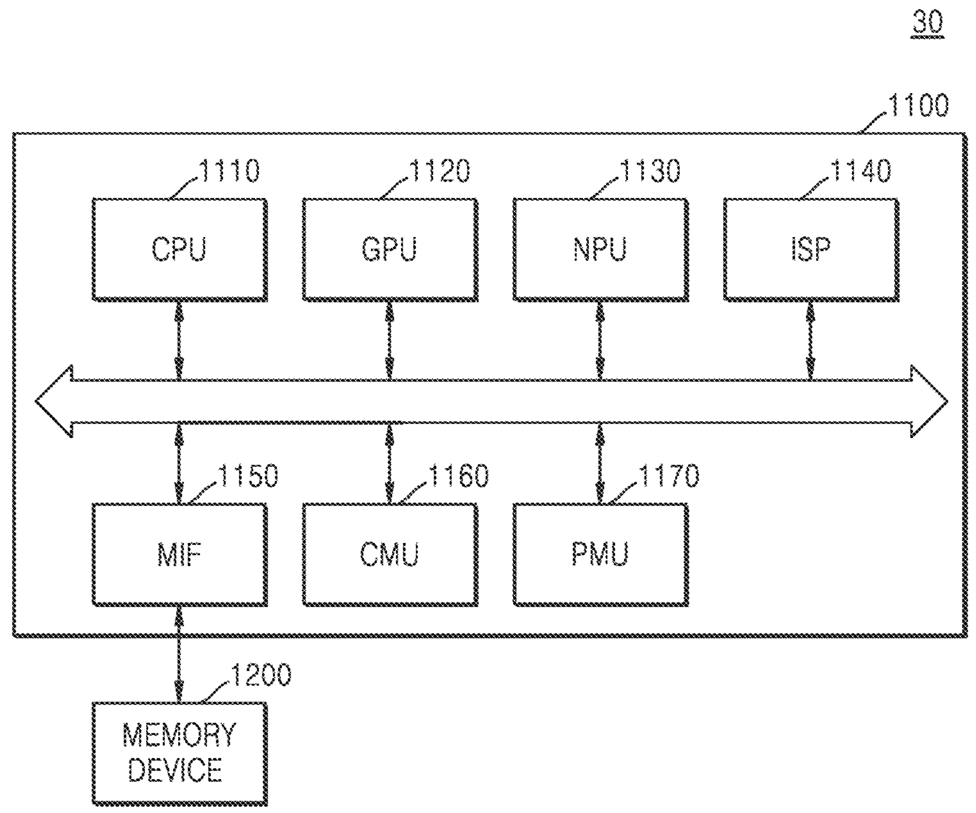
FIG. 11 is a block diagram of a system according to an example embodiment.

FIG. 11 is a block diagram of a system according to an example embodiment.

Referring to FIG. 11, a system 30 may be implemented as a handheld device, such as a mobile phone, a smartphone, a tablet computer, a PDA, an enterprise digital assistant (EDA), a digital still camera, a digital video camera, a portable multimedia player (PMP), a personal navigation device or portable navigation device (PND), a handheld game console, or an electronic book (e-book), but example embodiments are not limited thereto.

The system 30 may include an SoC 1100 and a memory device 1200. The SoC 1100 may include a CPU 1110, a GPU 1120, a neural processing unit (NPU) 1130, an image signal processor (ISP) 1140, a memory interface (MIF) 1150, a clock management unit (CMU) 1160, and a power management unit (PMU) 1170. The CPU 1110, the GPU 1120, the NPU 1130, the ISP 1140, and the MIF 1150 may be each an embodied example of the device 200 described with reference to FIGS. 1 to 10.

The CPU 1110 may process or execute commands and/or data stored in the memory device 1200 in response to a clock signal generated by the CMU 1160.

The GPU 1120 may obtain image data stored in the memory device 1200 in response to a clock signal generated by the CMU 1160. The GPU 1120 may generate data for an image that is output by a display unit (not shown) from image data provided by the MIF 1150 or encode the image data.

The NPU 1130 may refer to any device configured to execute a machine learning model. The NPU 1130 may be a hardware block designed to execute the machine learning model. The machine learning model may be a model based on an artificial neural network, a decision tree, a support vector machine, regression analysis, a Bayesian network, and a genetic algorithm. The artificial neural network may include, but is not limited thereto, at least one of convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, and classification network.

The ISP 1140 may perform a signal processing operation on raw data received from an image sensor (not shown) located outside the SoC 1100, and generate digital data with improved image quality.

The MIF 1150 may provide an interface for the memory device 1200 located outside the SoC 1100. The memory device 1200 may include DRAM, PRAM, resistive RAM (ReRAM), or flash memory.

The CMU 1160 may generate a clock signal and provide the clock signal to components of the SoC 1100. The CMU 1160 may include a clock generation device, such as a phase-locked loop (PLL), a delayed locked loop (DLL), and a crystal. The PMU 1170 may convert external power to internal power and supply the internal power as power to the components of the SoC 1100.

According to the above-described example embodiments, a cache memory may be efficiently utilized for the system 30, and the OS of the system 30 may improve.

Furthermore, according to devices and methods according to some example embodiments, in a system including a plurality of memory devices, cost due to a final cache miss may be reduced considering the cost of data access for each memory.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts have been particularly shown and described with reference to various example embodiments thereof, it will be understood that various changes in form and details may be made therein without departing from the spirit and scope of the following claims.

What is claimed is:

1. A cache memory controller comprising:

an internal memory configured to store a plurality of cost data sets and pieces of weight data on a plurality of internal elements included in the plurality of cost data sets, the plurality of cost data sets being related to data access; and a logic circuit configured to generate a first cost data set corresponding to data access to a first memory and a second cost data set corresponding to data access to a second memory, determine a target memory out of the first memory and the second memory, based on a weighted sum of the first cost data set and a weighted sum of the second cost data set that are calculated based on the pieces of the weight data, and select a cache line to be replaced, out of cache lines in which data read from the target memory is stored, from among a plurality of cache lines included in a cache memory, when a cache miss occurs after the cache memory is full of data, wherein the cache memory controller is configured to control the cache memory including the plurality of cache lines configured to temporarily store data from the first memory or the second memory.

2. The cache memory controller of claim 1, wherein the plurality of internal elements included in the plurality of cost data sets includes at least two of latency data for data access, data on power consumption, overhead data, data on usage of common resources comprising buses and systems, and low-power policy data reflecting impacts on a low-power policy.

3. The cache memory controller of claim 2, wherein the logic circuit is configured to calculate latency data for access to a read memory from which data is retrieved, together with data access, based on whether the cache miss has occurred or whether a cycle has been reached, or according to an external command, and the logic circuit is further configured to update latency data corresponding to the read memory based on the calculated latency data.

4. The cache memory controller of claim 3, wherein the logic circuit is configured to compare the weighted sum of the first cost data set and the weighted sum of the second cost data set again, based on a cost data set comprising the updated latency data, and the logic circuit is further configured to update the target memory.

5. The cache memory controller of claim 1, wherein the second memory is inside a second device, the second device being configured to be connected through a bus to a first device comprising the cache memory controller, the first memory, and the cache memory.

6. The cache memory controller of claim 1, wherein the logic circuit is configured to control the cache memory to store an index together during the storing of data in the cache memory, the index corresponding to information about a read memory from which data is retrieved, and wherein the cache line to be replaced is selected out of cache lines in which an index of the target memory is stored in the cache memory, when the cache miss occurs after the cache memory is full of data.

7. The cache memory controller of claim 1, wherein the logic circuit is configured to generate an N-th cost data set corresponding to data access to a memory in an N-th device connected to a first device through a bus, compare the weighted sum of the first cost data set, the weighted sum of the second cost data set, and a weighted sum of the N-th cost data set, and determine a target memory corresponding to a cost data set having a minimum weighted sum.

8. The cache memory controller of claim 1, wherein the logic circuit is configured to select the cache line to be replaced, based on at least one a Least Recently Used (LRU) scheme, a Most Recently Used (MRU) scheme, a Last In First Out (LIFO) scheme, and a First In First Out (FIFO) scheme.

9. The cache memory controller of claim 1, wherein the logic circuit is configured to update the pieces of weight data in response to an external command.

10. An operating method of a cache memory controller, the method comprising:

generating a first cost data set corresponding to data access to a first memory;

generating a second cost data set corresponding to data access to a second memory;

determining a target memory out of the first memory and the second memory, based on a weighted sum of the first cost data set and a weighted sum of the second cost data set that are calculated based on pieces of weight data; and selecting a cache line to be replaced, out of cache lines in which data read from the target memory is stored, from among cache lines included in a cache memory, when a cache miss occurs after the cache memory is full of data, wherein the cache memory controller is configured to control the cache memory which is configured to temporarily store data from the first memory or the second memory.

11. The method of claim 10, wherein the pieces of weight data determine weights of a plurality of internal elements included in a plurality of cost data sets, and wherein the plurality of internal elements include at least two of latency data for data access, data on power consumption, overhead data, data on usage of common resources comprising buses and systems, and low-power policy data reflecting impacts on a low-power policy.

12. The method of claim 11, further comprising:

calculating latency data for access to a read memory from which data is retrieved, together with data access, based on whether the cache miss has occurred or whether a cycle has been reached, or according to an external command; and updating latency data corresponding to the read memory, based on the calculated latency data.

13. The method of claim 12, further comprising comparing the weighted sum of the first cost data set and the weighted sum of the second cost data set again, based on a cost data set including the updated latency data, and updating the target memory.

14. The method of claim 10, wherein the second memory is inside a second device, the second device being configured to be connected through a bus to a first device comprising the cache memory controller, the first memory, and the cache memory.

15. The method of claim 10, further comprising storing an index together during the storing of data in the cache memory, the index corresponding to information about a read memory from which data is retrieved, wherein the selecting of the cache line to be replaced includes selecting the cache line to be replaced, out of cache lines in which an index of the target memory is stored in the cache memory.

16. The method of claim 10, further comprising generating an N-th cost data set corresponding to data access to a memory in an N-th device connected to a first device through a bus, wherein the determining of the target memory includes comparing the weighted sum of the first cost data set, the weighted sum of the second cost data set, and a weighted sum of the N-th cost data set, and determining a target memory corresponding to a cost data set having a minimum weighted sum.

17. The method of claim 10, wherein the selecting of the cache line to be replaced is performed based on at least one a Least Recently Used (LRU) scheme, a Most Recently Used (MRU) scheme, a Last In First Out (LIFO) scheme, and a First In First Out (FIFO) scheme.

18. The method of claim 10, further comprising updating the pieces of weight data in response to an external command.

* * * * *